United States Patent
Pantano et al.

(10) Patent No.: US 11,870,389 B2
(45) Date of Patent: Jan. 9, 2024

(54) MELTING SNOW AND/OR ICE ACCUMULATING ON MODULES OF A PHOTOVOLTAIC ARRAY

(71) Applicant: Inventus Holdings, LLC, Juno Beach, FL (US)

(72) Inventors: Jonathan Pantano, Palm Beach Gardens, FL (US); Natasha V. Anbalagan, North Palm Beach, FL (US)

(73) Assignee: INVENTUS HOLDINGS, LLC, Juno Beach, FL (US)

(*) Notice: Subject to any disclaimer, the term of this patent is extended or adjusted under 35 U.S.C. 154(b) by 99 days.

(21) Appl. No.: 17/481,286

(22) Filed: Sep. 21, 2021

(65) Prior Publication Data
US 2023/0088121 A1   Mar. 23, 2023

(51) Int. Cl.
*H02S 40/12* (2014.01)
*H02S 40/32* (2014.01)
*H02S 40/44* (2014.01)

(52) U.S. Cl.
CPC .............. *H02S 40/12* (2014.12); *H02S 40/32* (2014.12); *H02S 40/44* (2014.12)

(58) Field of Classification Search
CPC ........................... H02S 40/12; H02S 40/30–38
See application file for complete search history.

(56) References Cited

U.S. PATENT DOCUMENTS 6,093,885 A * 7/2000 Takehara ................ H02S 40/12
136/291

FOREIGN PATENT DOCUMENTS

| JP | 10284746 A | * | 10/1998 |
| JP | 11215733 A | * | 8/1999 |
| JP | 2000156940 A | * | 6/2000 |
| JP | 2001257376 A | * | 9/2001 |
| JP | 2002118274 A | * | 4/2002 |

OTHER PUBLICATIONS

Machine translation of JP11-215733A (Year: 1999).*
Machine translation of JP10-284746A (Year: 1998).*
Machine translation of JP2000-156940A (Year: 2000).*
Machine translation of JP2001-257376A (Year: 2001).*
Machine translation of JP2002-118274A (Year: 2002).*

* cited by examiner

*Primary Examiner* — Ryan S Cannon
(74) *Attorney, Agent, or Firm* — TAROLLI, SUNDHEIM, COVELL & TUMMINO, LLP

(57) ABSTRACT

A controller of a power generation system provides, in response to a request or a determination to initiate a heating mode for a photovoltaic (PV) array, a first instruction to an inverter coupled between the PV array and a power grid to apply an initial backfeed voltage on PV modules of the PV array. The PV array comprises a plurality of strings of PV modules coupled in parallel, and a first subset of the strings of PV modules are online and a second subset of the strings of PV modules are offline. The controller monitors current data from a set of current sensors that each measure current provided from a corresponding set of strings of PV modules of the plurality of strings of PV modules of the PV array. The controller also provides a second command to the inverter to adjust the backfeed voltage.

20 Claims, 4 Drawing Sheets

MELTING SNOW AND/OR ICE ACCUMULATING ON MODULES OF A PHOTOVOLTAIC ARRAY

TECHNICAL FIELD

This disclosure relates to a power generation system that melts snow and/or ice accumulating on photovoltaic (PV) modules of a PV array.

BACKGROUND

Photovoltaic (PV) power generation systems are power systems that employ a plurality of solar modules to convert sunlight into electricity. PV systems include multiple components, including PV modules, mechanical and electrical connections and mountings, and signal conditioners for regulating or modifying the electrical output. In some examples, several PV modules are connected in series to form a PV string, with multiple PV strings in a PV system then being combined in parallel to aggregate the current in a PV array. PV strings can alternatively be referred to as a string of PV modules. PV modules generate direct current (DC) power, with the level of DC power being dependent on solar irradiation and the level of DC voltage dependent on temperature. When alternating current (AC) power is desired, an inverter is used to convert the DC power into AC power, such as AC power suitable for transfer to a power grid.

During inclement weather, snow and/or ice can accumulate on PV modules (PV panels) thereby inhibiting the ability of such PV modules to convert sunlight into DC power. In some climates, snow and/or ice may be present frequently, which can lower an overall power generation of a PV array for a given year. For instance, heavy snow environments and severe ground interference can result in annual losses from snow of 30% or more.

SUMMARY

One example relates to a controller of a power generation system that provides, in response to a request or a determination to initiate a heating mode for a photovoltaic (PV) array, a first instruction to an inverter coupled between the PV array and a power grid to apply an initial backfeed voltage on PV modules of the PV array. The PV array comprises a plurality of strings of PV modules coupled in parallel, and a first subset of the strings of PV modules are online and a second subset of the strings of PV modules are offline. The controller monitors current data from a set of current sensors that each measure current provided from a corresponding set of strings of PV modules of the plurality of strings of PV modules of the PV array. The controller provides a second command to the inverter to adjust the backfeed voltage such that the current data from at least one current sensor indicates that current flowing from the power grid to a corresponding set of strings of PV modules is below a safety threshold. A current flowing to the corresponding set of PV modules is about equal to a current flowing to each of the first subset of strings of PV modules that are online, such that a surface temperature of each PV module in the first subset of strings of PV modules is increased.

Another example relates to a power generation system that includes an inverter coupled between a power grid and a PV array. The PV array comprises a plurality of strings of PV modules coupled in parallel, and a first subset of the strings of PV modules are online and a second subset of the strings of PV modules are offline. The power generation system also includes a PV array switchably coupled to the inverter and a set of current sensors that each measure current provided from a corresponding set of strings of PV modules of the plurality of strings of PV modules of the PV array. The power generation system further includes a controller that provides a first command to the inverter to apply an initial backfeed voltage on the PV modules. The controller can monitor current data from a set of current sensors that each measure current provided to a corresponding set of strings of PV modules of the plurality of strings of PV modules of the PV array. The controller can also provide a second command to the inverter to increase the backfeed voltage such that the current data from at least one current sensor indicates that current flowing from the power grid to a corresponding set of strings of PV modules is below a safety threshold. Current flowing to the corresponding set of PV modules is about equal to a current flowing to each of the first subset of strings of PV modules that are online, such that a surface temperature of each PV module in the first subset of strings of PV modules is increased.

Still another example relates to a method for melting snow and/or ice accumulating on photovoltaic modules of a PV array. The method includes providing, from a controller, a first instruction to an inverter coupled between the PV array and a power grid to apply an initial backfeed voltage on PV modules of the PV array. The PV array comprises a plurality of PV strings of PV modules coupled in parallel, and a first subset of the strings of PV modules are online and a second subset of the strings of PV modules are offline. The method also includes monitoring current data from a set of current sensors that each measure current provided from a corresponding set of strings of PV modules of the plurality of strings of PV modules of the PV array. The method further includes providing a second instruction to the inverter to adjust the backfeed voltage such that the current data from at least one current sensor indicates that current flowing from the power grid to a corresponding set of strings of PV modules is below a safety threshold. Current flowing to the corresponding set of PV modules is about equal to a current flowing to each of the first subset of strings of PV modules that are online, such that a surface temperature of each PV module in the first subset of strings of PV modules is increased.

DETAILED DESCRIPTION

Figure 1:
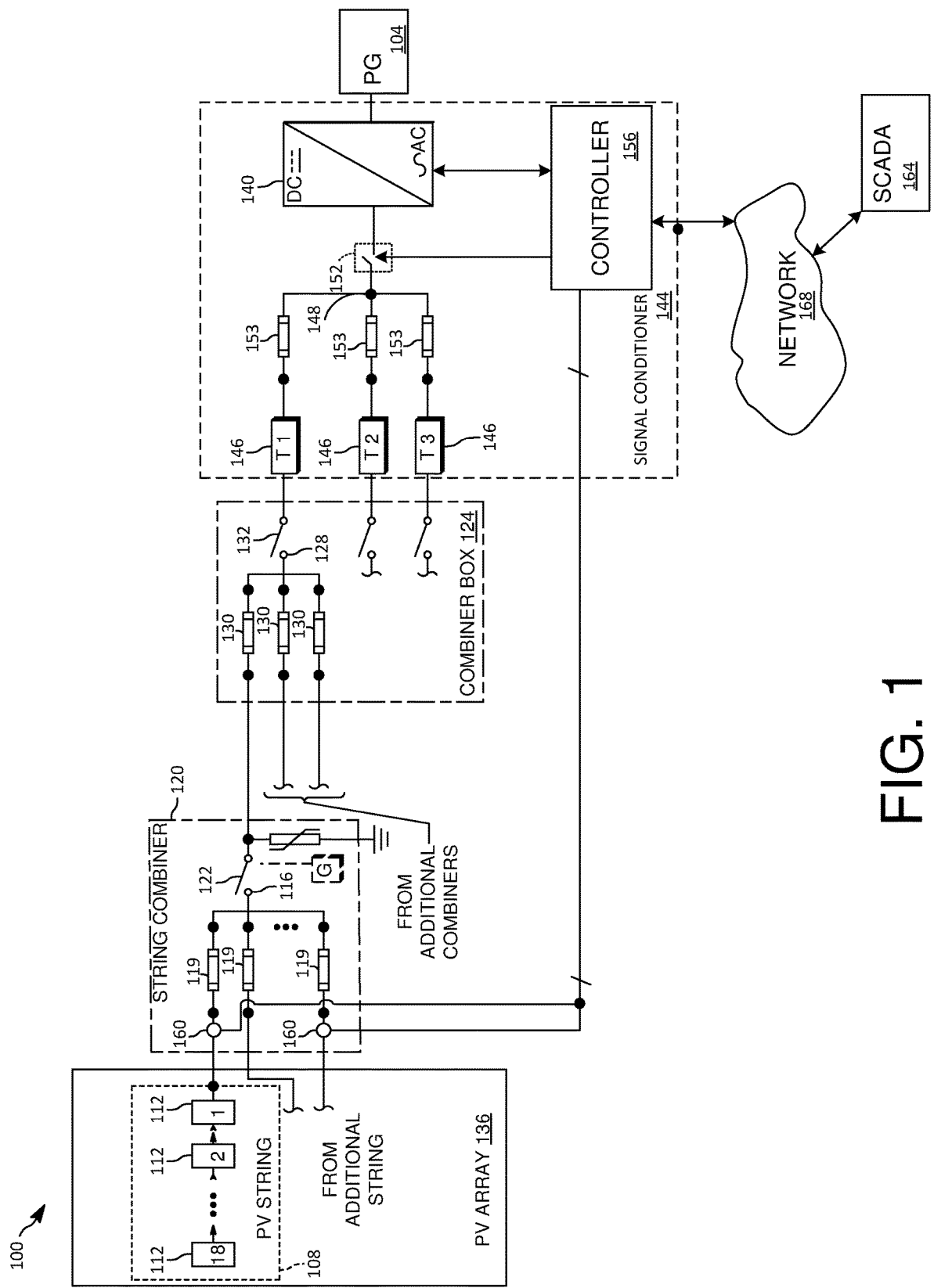
FIG. 1 illustrates an example of a power generation system that can melt snow and/or ice accumulating on PV modules of a PV array in the power generation system.

The present disclosure is related to systems and methods for melting snow and/or ice that accumulates on photovoltaic (PV) modules of a PV array by controlling operations of a power generation system. The power generation system includes an inverter coupled between a power grid and the PV array. The PV array includes a plurality of PV strings coupled in parallel. Each PV string is formed of a plurality of PV modules coupled in series.

The PV array is switchably coupled to the inverter, and a first subset of the PV strings are online and a second subset of the PV strings are offline. PV strings that have a conductive path between PV modules of the respective PV string and the power grid through the inverter are considered to be online, and PV strings with PV modules that are disconnected from the inverter and the power grid (e.g., due to an open switch or a blown fuse) are considered to be offline.

The power generation system includes a set of current sensors that each measure current provided from a corresponding set of PV strings of the plurality of PV strings. The power generation system also includes a controller that provides a first command to the inverter to apply an initial backfeed voltage on the PV modules. In some examples, the first instruction is provided to the inverter in response to a request from an external system to initiate a heating mode for the PV array. In other examples, the first instruction is made in response to the controller making a determination that the PV array should operate in the heating mode (e.g., due to a power output to the power grid dropping below a power generation threshold).

The controller receives and monitors current data from a set of current sensors that each measure current provided from a corresponding set of PV strings of the PV array. In particular, responsive to sending the first instruction to the inverter to set the initial backfeed voltage, the controller monitors the current data to ensure that current flowing to the PV strings does not exceed a safety threshold for the PV modules of the corresponding set of PV strings.

The controller also can provide a second instruction to the inverter to increase (or decrease) the backfeed voltage until the current data from at least one current sensor indicates that current flowing from the power grid to a corresponding set of PV strings has reached a safety threshold. Current flowing to the corresponding set of PV strings is about equal to a current flowing to each online PV string (e.g., the first subset of PV strings that are online), such that a surface temperature of each PV module in the first subset of PV strings is increased. Increasing the surface temperature of the PV modules causes snow and/or ice that has accumulated on the online PV modules to melt. Conversely, the surface temperature of offline PV modules is independent of the backfeed voltage. Moreover, over time, some PV strings that were online may go offline (e.g., due to open switches or blown fuses). Additionally, replacement of blown fuses and/or closing of switches causes some PV strings that were offline to come online. Monitoring the current data enables the controller to instruct the inverter to dynamically adjust the backfeed voltage to compensate for these PV strings going offline or coming online. Accordingly, by implementing the power generation system described herein, snow and/or ice accumulating on the PV modules of online PV strings is removed (melted) without physically contacting the PV modules, thereby obviating the need for manually removing the snow and/or ice.

FIG. 1 illustrates an example of an arrangement for a power generation system 100 to provide alternating current (AC) power to a power grid 104. It is noted that the arrangement in FIG. 1 is only one example of a possible arrangement, many similar or different arrangements are possible, as is appreciated by one of ordinary skill in the art. The power generation system 100 has B number of PV strings 108 formed of PV modules 112 connected in series, where B is an integer greater than or equal to two. In some examples, each of the B number of PV strings 108 can have the same number of PV modules 112 connected in series (e.g., 18). In this situation, each PV string 108 is configured to provide a maximum output of about 8 amperes (A) of current. In other examples, PV strings 108 can have different numbers of PV modules 112.

A set of PV strings 108 is coupled to a port 116 of a string combiner 120. In some examples, three (3) PV strings 108 can be coupled to a common port 116 of the string combiner 120. In other examples, there can be more or less PV strings 108 in the set of PV strings 108. In some examples, the string combiner 120 can be representative of a harness. The port 116 can be coupled to a node of a combiner switch 122. In some examples, a set of combiner fuses 119 are coupled between the port 116 and each respective set of PV strings 108.

Additionally, a set of string combiners 120 can be coupled to a combiner box 124 at a port 128 of the combiner box 124 through the combiner switch 122. Moreover, in some examples, a combiner box fuse 130 is coupled between a corresponding combiner switch 122 and the port 128 of the combiner box 124. In some examples, three (3) string combiners 120 are coupled to a common port 128 of the combiner box 124. In this situation, there would be three (3) combiner box fuses 130 coupled between the common port 128 and three (3) corresponding combiner switches 122. In other examples, more or less string combiners 120 can be in the set of string combiners 120. Each port 128 of the combiner box 124 can be coupled to a corresponding combiner box switch 132. It is noted that the string combiners 120 and the combiner box 124 can collectively be referred to as a "combiner" in some examples. A combination of the PV strings 108 coupled to the combiner box 124 (including those not illustrated) can be collectively referred to as a PV array 136.

Each port 128 of the combiner box 124 can be coupled to an inverter 140 of a signal conditioner 144 through a corresponding combiner box switch 132 at a port 148. In the present example, it is presumed that there are R number of ports 128 of the combiner box 124, where R is an integer greater than one. A disconnect switch 152 is coupled between the port 148 and the inverter 140. Moreover, an inverter fuse 153 is couple between each of the R number of ports 128 and the port 148 of the signal conditioner 144.

Additionally, R number of (current and voltage) transducers (T) 146 are coupled to the corresponding R number of ports 128 of the combiner box 124. Each transducer 146 can (passively) monitor a respective input signal provided to the inverter 140. Moreover, in some examples, each of the transducers 146 can be integrated with the inverter 140. In some examples the transducers 146 provide substantially real time data characterizing the output of the PV array 136, which can collectively be referred to as PV data.

The inverter 140 is controlled by a controller 156. In some examples, the inverter 140 can provide data characterizing an amount of power (e.g., voltage and current) provided to the power grid 104 at a given time. Furthermore, the controller 156 can cause the inverter 140 to operate in reverse mode, which causes the inverter 140 to convert AC voltage from the power grid 104 into a backfeed voltage (a DC voltage) that is applied to the PV array 136. Additionally, in some examples, the controller 156 of the signal conditioner 144 controls a state of the disconnect switch 152. In some examples, the controller 156 can also control a state of the combiner box switches 132 and/or the combiner switches 122. In other examples, the disconnect switch 152, the combiner box switches 132 and/or the combiner switches 122 are manually controlled. The controller 156 is implemented as a computing device (or multiple computing devices), such as a PLC or a microcontroller that executes machine-readable instructions. The controller 156 has a non-transitory machine-readable medium that stores the machine-readable instructions that (when executed) control operations of the power generation system 100.

Some of the PV strings 108 have a current sensor 160 coupled downstream between the corresponding port 116 and a last PV module 112. Each current sensor 160 provides current data to the controller 156. In some examples, only a proper subset of PV strings 108 of the PV array 136 has a current sensor 160. In such examples, one or more of the PV strings 108 in the PV array 136 does not have a current sensor 160 assigned thereto.

In some examples, data collected by the controller 156 communicates with a supervisory control and data acquisition (SCADA) system 164 through a network 168. The network 168 can be implemented as a private network (e.g., a utility network), a public network (e.g., the Internet) or some combination thereof. The SCADA system 164 can be representative of software executing on a server, such as an on-premises server or a cloud-based server. The SCADA system 164 can provide commands/requests to the controller 156. Responsive to these commands/requests, the controller 156 provides instructions to the inverter 140, the disconnect switch 152, the combiner box switches 132 and/or the combiner switches 122. Accordingly, in this manner certain operations of the power generation system 100 can be controlled remotely.

In a first mode of operation, which can be referred to as a power generation mode, each of the PV modules 112 is configured to absorb sunlight and generate direct current (DC) power that is provided to the string combiners 120, and the combiner box 124. Additionally, this DC power is provided to the inverter 140. In response to the DC power, the inverter 140 converts the DC power into AC power that is applied to the power grid 104 (e.g., through a transformer).

In many instances, the PV array 136 is deployed in an environment with inclement weather. In some such situations, snow and/or ice can accumulate on the PV modules 112 or some subset thereof. This snow and/or ice blocks the PV modules 112 from absorbing sunlight, which in turn lowers a power output by the PV modules 112 on which snow and/or ice has accumulated. Moreover, as more and more snow and/or ice accumulates, the less and less power is generated by the PV array 136.

Conventionally, removal of snow and/or ice from the PV modules 112 of the PV array 136 is a labor intensive, and manual process. Accordingly, in some examples, the SCADA system 164 can monitor environmental conditions (e.g., weather) of the PV array 136, and determine that some PV modules 112 of the PV array 136 have likely accumulated snow and/or ice that is impeding absorption of light. In this example, the SCADA system 164 can instruct the controller 156 to switch to a second mode of operation, namely a heating mode. Additionally or alternatively, the SCADA system 164 can instruct the controller 156 to switch to the heating mode in situations where a power output by the inverter 140 drops below a power generation threshold during a time interval where a greater output power is expected (e.g., during daylight hours). That is, in such examples, the power generation threshold can vary as a function of time. For instance, if the power generation system 100 is expected to output a particular wattage (e.g., 1 megawatt (MW)) at a particular time of day (e.g., noon), and the power generation system 100 is outputting about 10% of the expected output, the SCADA system 164 can send a request to the controller 156 that the controller 156 switch the power generation system 100 from the power generation mode to the heating mode. Alternatively, in some examples, the controller 156 can make the determination that the PV array 136 is outputting power less than the power generation threshold for the given time, such that the controller 156 determines that the power generation system should switch to the heating mode.

In the heating mode, the controller 156 provides an instruction to the inverter 140 to apply an initial backfeed voltage to the PV modules 112 of the PV array 136. Responsive to the instruction, the inverter 140 applies a backfeed voltage sufficient to reverse the flow of current at the inverter 140, such that current flows from the power grid 104 to the PV modules 112 (instead of the reverse in the power generation mode). In some examples, the controller 156 delays providing the command to the inverter 140 until after sundown, such that the DC voltage output by the PV modules 112 of the PV array 136 is about 0 volts (V), such that the initial backfeed voltage can be voltage that is greater than 0 V. Unless otherwise stated, in this description, 'about' or 'approximately' preceding a value means+/−10 percent of the stated value. In other examples, such as during daylight hours, PV modules 112 may provide a voltage of about 18 V and the inverter 140 sets the initial backfeed voltage to a voltage greater than 18 V to reverse the flow of current. Current flowing to the PV modules 112 causes each online PV module 112 to heat. As used herein, a given PV module 112 is considered to be 'online' if the given PV module 112 has a conductive path to the power grid 104. Conversely, a given PV module 112 is considered to be 'offline' if there is no such conductive path. For instance, opening of a particular combiner switch 122, a combiner box switch 132 or the disconnect switch 152 causes some (or all) of the PV modules 112 that are downstream from the open switch to go offline. Similarly, if a fuse, such as a combiner fuse 119, a combiner box fuse 130 or an inverter fuse 153 is blown, PV modules 112 downstream from the blown fuse go offline. Additionally, if each PV module 112 of a given PV string 108 is online (or offline), that given PV string 108 is also considered to be online (or offline).

The controller 156 monitors the current data from the current sensors 160 coupled to the proper subset of PV strings 108 of the PV array 136 to ensure that the current provided to the PV modules 112 is below a safety threshold. In situations where the combiner switches 122, the combiner box switches 132, and the disconnect switch 152 are closed, the PV strings 108 are coupled in parallel. Current sensors 160 that are coupled to offline PV strings 108 report a current of about 0 amperes (A). Accordingly, if one or more of the combiner fuses 119, the combiner box fuses 130 or the inverter fuses 153 have blown, PV modules 112 downstream from the blown fuse go offline, such that current to the remaining online PV modules 112 increases if the backfeed voltage remains relatively constant.

The initial backfeed voltage causes the online PV modules 112 to heat, thereby melting snow and/or ice that has accumulated on the PV modules 112 without physical intervention (e.g., manually removing the snow and/or ice). Additionally, to accelerate the heating of the online PV modules 112, the controller 156 detects a current that is greater than 0 A (indicating that downstream PV modules 112 are online). The controller 156 infers that each online PV modules 112 receives the same current (because each PV modules 112 has about the same impedance). Thus, the controller 156 calculates a tuned backfeed voltage that brings the current flowing to the online PV modules 112 to a level is below (e.g., about 10% less) than the safety threshold for the PV modules 112. The safety threshold defines a maximum safe current for the PV modules 112 that does not cause damage. That is, current resulting from the backfeed voltage applied by the inverter 140 below the safety threshold does not damage the online PV modules 112. The calculation of the tuned backfeed voltage is based on a number of online PV strings 108 in the PV array 136. After calculating the tuned backfeed voltage, the controller 156 provides an instruction to the inverter 140 to ramp the backfeed voltage from the initial backfeed voltage to the tuned backfeed voltage.

The controller 156 monitors the current data provided from the current sensors 160 periodically and/or asynchronously. If one of the PV strings 108 goes offline while the power generation system 100 is operating in the heating mode, the current reported by at least one current sensor 160 will change. That is, if a current sensor 160 upstream of a PV string 108 that goes offline will drop to about 0 A, and a current sensor 160 upstream from a PV string 108 that remains online (after another goes offline) will increase. In this situation, the controller 156 recalculates the tuned backfeed voltage, and provides an instruction to the inverter 140 to adjust the backfeed voltage to the updated level. In response, the inverter 140 ramps the backfeed voltage to the (recalculated) tuned backfeed voltage to ensure that the current flowing to the online PV modules 112 does not exceed the safety threshold.

In some examples, after operating in the second mode of operation for a predetermined amount of time (e.g., 1 hour or more), the controller 156 can be configured to switch the power generation system 100 back to the power generation mode to determine if the snow and/or ice that has accumulated on the PV modules 112 of the PV array 136 has melted sufficiently. In such a situation, after the predetermined amount of time, the controller 156 can provide a request to the inverter 140 to disable the backfeed voltage. Responsive to this request, the inverter 140 can lower the backfeed voltage to about 0 V, such that power generation by the PV array 136 resumes. The inverter 140 can provide data characterizing a level of power provided to the power grid 104 to the controller 156. If the level of power provided to the power grid 104 meets the power generation threshold for the given time period (e.g., during daylight hours), the controller 156 can determine that the snow and/or the ice on the PV modules 112 has been sufficiently melted, such that the power generation system 100 can continue to operate in the power generation mode. In this situation, the controller 156 can provide a report back to the SCADA system 164 that the power generation system 100 is operating within acceptable limits, such that no intervention is needed.

Conversely, if the level of power provided to the power grid 104 does not meet the power generation threshold, the controller 156 can switch the power generation system 100 back to the heating mode of operation. As noted, in the heating mode of operation, the controller 156 can provide an instruction to the inverter 140 to assert the initial backfeed voltage, and adjust the backfeed voltage accordingly. Thus, this process can be repeated until the power output by the inverter 140 reaches the power generation threshold for the corresponding time.

Still further, as noted, in some examples, the controller 156 can control a state of the combiner switches 122 and the combiner box switches 132. In these situations, in the heating mode of operation the controller 156 can selectively open certain combiner switches 122 and/or combiner box switches 132 to heat specific PV strings 108 of the PV array 136. For example, in situations where a-priori knowledge (e.g., through a camera or by visual inspection) indicates that only a small subset of PV strings 108 have accumulated snow and/or ice, the controller 156 can selectively open the combiner switches 122 and/or the combiner box switches 132 to bring most of the PV strings 108 offline, and then calculate the tuned backfeed voltage accordingly. After the subset of PV modules 112 are heated for a sufficient duration of time (e.g., the time needed to heat the snow and/or ice on the subset of PV modules 112), the controller 156 can re-close the (opened) combiner switches 122 and/or combiner box switches 132 to bring the offline PV modules 112 back online. Accordingly, this approach reduces the amount of power needed to heat the PV modules 112 sufficiently to return the power generation system 100 to the power generation threshold.

By employing the power generation system 100, the backfeed voltage is adjusted to avoid exceeding the safety threshold for the PV modules 112. More particularly, the backfeed voltage is dynamic, and varies based on a number of PV modules 112 of the PV array 136 that are online at a given time. Thus, as the number of offline PV strings 108 increases, the backfeed voltage can be decreased to compensate, such that the remaining online PV strings 108 do not receive a current exceeding the safety threshold.

Figure 2:
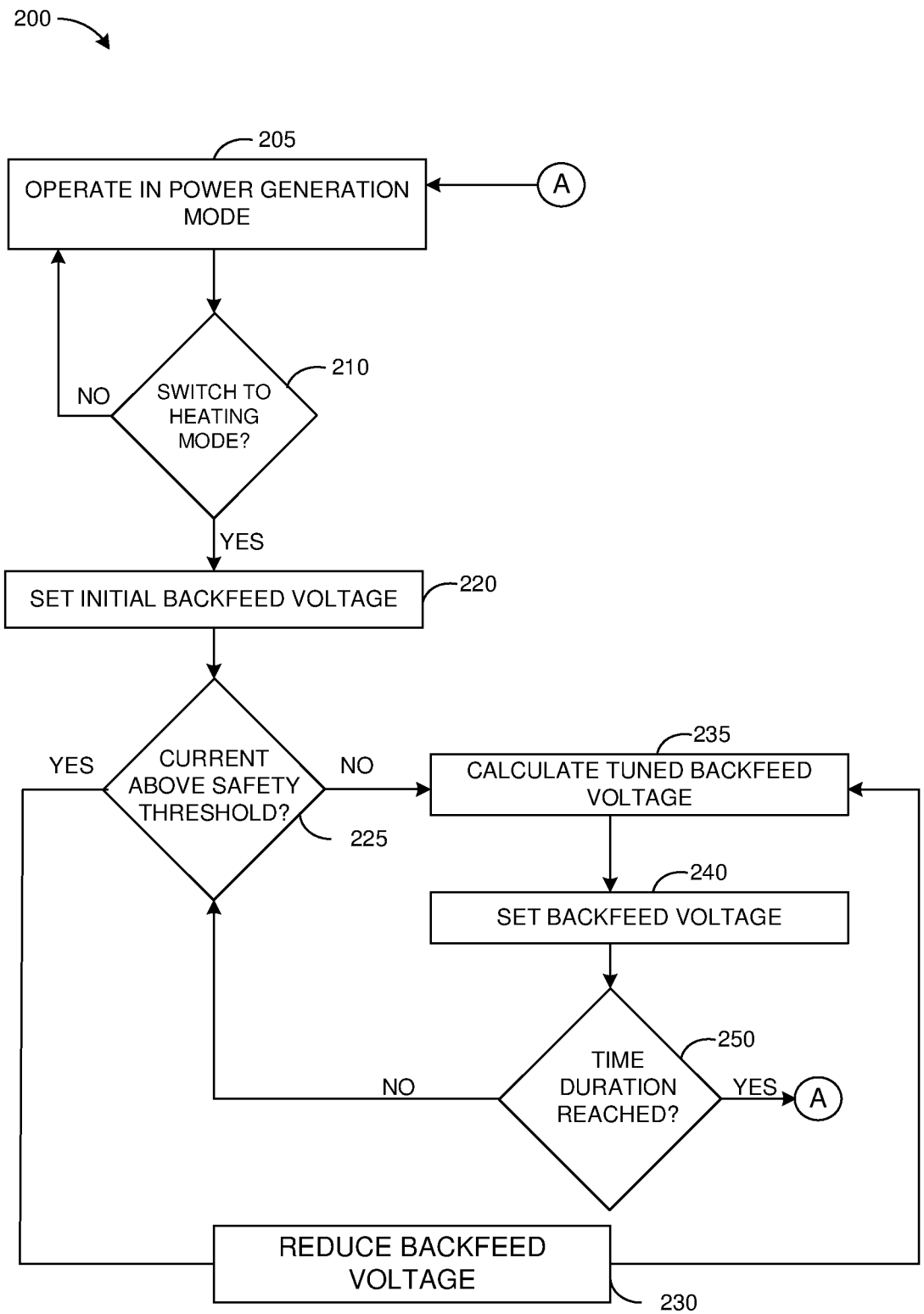
FIG. 2 illustrates a flowchart of an example method for melting snow and/or ice accumulating on PV modules of a PV array in a power generation system.
Figure 3:
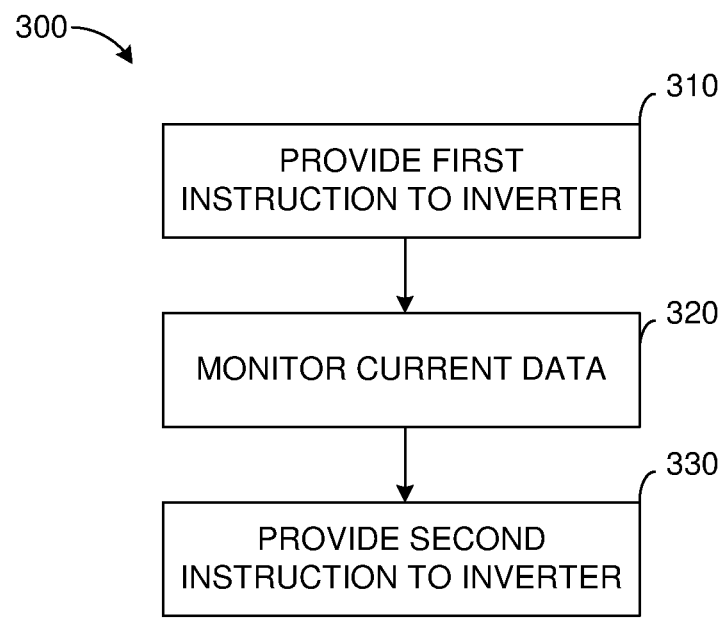
FIG. 3 illustrates a flowchart of another example method for melting snow and/or ice accumulating on PV modules of a PV array in a power generation system.

In view of the foregoing structural and functional features described above, example methods will be better appreciated with reference to FIGS. 2 and 3. While, for purposes of simplicity of explanation, the example methods of FIGS. 2 and 3 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 2 and 3 can be implemented as instructions stored in a non-transitory machine-readable medium. The instructions can be accessed by a processing resource (e.g., one or more processor cores) and executed to perform the methods disclosed herein.

FIG. 2 illustrates a flowchart of an example method 200 for melting snow and/or ice that has accumulated on PV modules of a PV array, such as the PV array 136 of FIG. 1. The method 200 can be executed by a controller (e.g., a PLC), such as the controller 156 of FIG. 1 communicating with a power generation system, such as the power generation system 100 of FIG. 1.

At 205, the controller provides a command to an inverter (e.g., the inverter 140 of FIG. 1) to operate in a power generation mode (e.g., a first mode). In the power generation mode, the inverter converts DC power generated by the PV modules (e.g., the PV modules 112 of FIG. 1) of the PV array into AC power that is applied to a power grid, such as the power grid 104 of FIG. 1.

At 210 the controller makes a determination as to whether to switch to a heating mode. In some examples, the determination at 210 can be made in response to a command from an external system (e.g., a SCADA system) that monitors weather conditions (and/or other parameters) and determines that snow and/or ice may have accumulated on the PV modules. In this example, the controller makes a positive (e.g., YES) determination at 210 if the controller receives the command from the external system instructing the controller to switch to the heating mode and makes a negative (e.g., NO) determination at 210 if no such command is received.

In other examples, the determination at 210 is made based on the controller (or the SCADA system) determining that a power output by the inverter to the power grid has dropped below a power generation threshold. The power generation threshold can vary as a function of time and/or weather conditions. In some situations, the power dropping below the power generation threshold occurs due to snow and/or ice accumulating on the PV modules, thereby inhibiting the ability of the PV modules to generate DC power. In this example, the controller makes a positive (e.g., YES) determination at 210 if the power output by the inverter is less than the power generation threshold and makes a negative (e.g., NO) determination at 210 if the power output by the inverter is greater than the power generation threshold. In any such example, if the determination at 210 is negative (e.g., NO), the method 200 returns to 205. If the determination at 210 is positive (e.g., YES), the method 200 proceeds to 220.

At 220, the controller provides an instruction to the inverter 140 to set an initial backfeed voltage. In response, the inverter disables conversion of DC to AC power, and instead provides a DC backfeed voltage to the PV modules of the PV array to reverse a flow of current. At 225, a determination is made as to whether a current flowing to the PV modules exceeds a safety threshold. If the determination at 225 is positive (e.g., YES), the method proceeds to 230. If the determination at 225 is negative (e.g., NO), the method proceeds to 235. The determination at 225 can be based, for example, on current data provided from current sensors (e.g., the current sensors 160 of FIG. 1) characterizing current flowing to strings of PV modules (e.g., the PV strings 108 of FIG. 1).

At 230, the controller provides an instruction to the inverter to reduce the backfeed voltage, and the method 200 proceeds to 240. At 235, the controller calculates a tuned backfeed voltage for the PV array based on the current data provided from the current sensors. The tuned backfeed voltage is based on the number of PV strings that are online at a given time. In some situations, a first subset of the PV strings is online, and a second subset of the PV strings are offline (e.g., due to blown fuses and/or open switches). The current data provided from the current sensors is employable to estimate the number of PV strings that are offline, and the number of PV strings that are online. Moreover, it is presumed that for each current sensor that senses a current greater than 0 A flowing to the respective PV string has about the same current. In some examples, the backfeed voltage can be tuned to a level that is about 10% less than the safety threshold. At 240, the controller provides an instruction to the inverter that causes the inverter to set the backfeed voltage to the calculated (tuned) backfeed voltage. The backfeed voltage causes a surface of the PV modules to heat, thereby melting snow and/or ice that has accumulated on the PV modules that are online.

In some examples, at 250, the controller makes a determination as to whether a time duration for operating in the heating mode has been reached. Expiration of the time duration can indicate that the PV modules have been heated for a time sufficient for snow and/or ice on the PV modules to have melted. If the determination at 250 is negative (e.g., NO), the method 200 returns to 225. If the determination at 250 is positive, the method 200 proceeds to node A, and the method returns to 205, such that the power generation system switches back to the power generation mode.

As is illustrated by the loop formed by 225-250, the controller monitors the current data to ensure that a current flowing to the online PV strings does not exceed the safety threshold. Moreover, in situations where a given PV string goes offline (such that current data indicates that current flowing to the given PV string drops to about 0 A), the backfeed voltage would be re-calculated, and adjusted accordingly. In this manner, the backfeed voltage is dynamically adjusted to compensate for actions that cause PV strings to go offline (e.g., blown fuses and/or open switches). Accordingly, the method 200 enables the controller to control operations of the power generation system such that snow and/or ice that has accumulated on the PV modules is melted without damaging the PV modules (e.g., due to overcurrent).

FIG. 3 illustrates a flowchart of another method 300 for heating PV modules (e.g., the PV modules 112 of FIG. 1) of a PV array (e.g., the PV array 136 of FIG. 1). The method 300 can be executed by a controller (e.g., the controller 156 of FIG. 1). At 310, the controller can provide a first instruction to an inverter coupled between the PV array and a power grid (e.g., the power grid 104 of FIG. 1) to apply an initial backfeed voltage on PV modules of the PV array. The PV array includes a plurality of PV strings (e.g., the PV strings 108) coupled in parallel, and a first subset of the PV strings are online and a second subset of the PV strings are offline. Moreover, in some examples, the controller provides the first instruction in response to a request (or a determination) that the PV array should operate in the heating mode (instead of a power generation mode).

At 320, the controller monitors current data from a set of current sensors that each measure current provided from a corresponding set of PV strings of the PV array. At 330, the controller provides a second instruction to the inverter to adjust the backfeed voltage until the current data from at least one current sensor indicates that current flowing from the power grid to a corresponding set of strings of PV modules is below a safety threshold. Current flowing to the corresponding set of PV modules is about equal to a current flowing to each of the first subset of strings of PV modules that are online, such that a surface temperature of each PV module in the first subset of strings of PV modules is increased.

Figure 4:
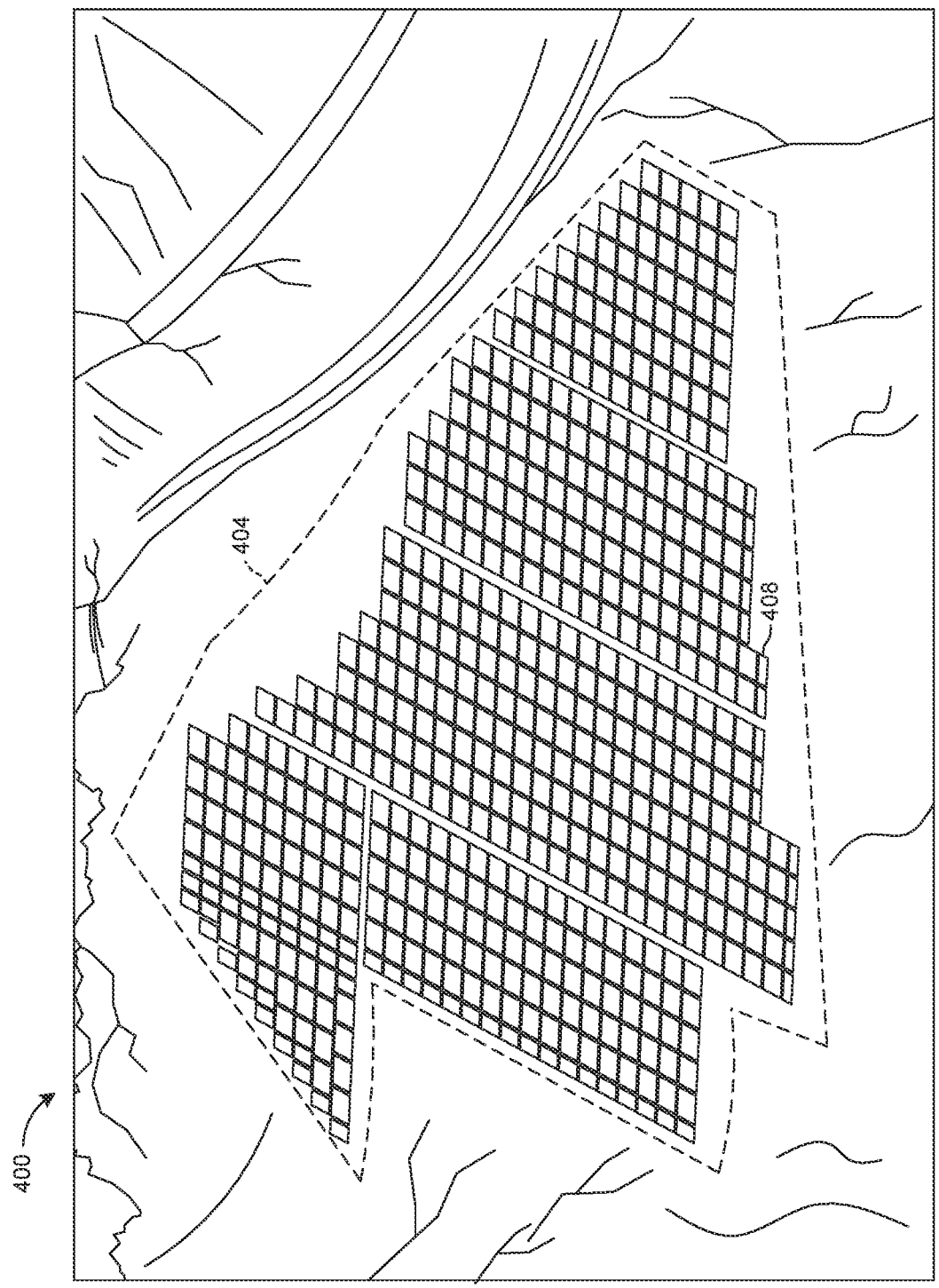
FIG. 4 illustrates an example of a PV array with PV modules that can be heated with a backfeed voltage.

FIG. 4 illustrates a photograph 400 of a PV array 404 that could be employed to implement the PV array 136 of FIG. 1. In such a situation, each PV module 408 (only one of which is labeled) converts ambient light into DC electrical power. The PV modules 408 can be connected together in PV strings, such as the PV strings 108 of FIG. 1.

As illustrated, the sheer number of PV modules 408 makes manual removal of accumulated snow and/or ice of each PV module 408 extremely cumbersome. Furthermore, the number of PV modules 408 in the PV array 404 increases the likelihood that some PV modules 408 will go offline in a non-predictable manner. Thus, by employment of the power distribution system 100 of FIG. 1, the backfeed voltage can be set to heat a surface of online PV modules 408 to melt such accumulated snow and/or ice without physically contacting the PV array 404. That is, the backfeed voltage causes the surface temperature of online PV modules 408 to increase. Additionally, the surface temperature of offline PV modules 408 is independent of the backfeed voltage, because the offline PV modules do not receive the backfeed voltage. Additionally, the backfeed voltage is adjusted dynamically in situations where PV strings go offline (e.g., due to blown fuses and/or open switches) to keep current flowing to the online PV modules 408 below a safety threshold, such as about 10% less than the safety threshold.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications and variations that fall within the scope of this application, including the appended claims. Where the disclosure or claims recite "a," "an," "a first," or "another" element or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A controller of a power generation system that:
    provides, in response to a request or a determination to initiate a heating mode for a photovoltaic (PV) array, a first instruction to an inverter coupled between the PV array and a power grid to apply an initial backfeed voltage on PV modules of the PV array, wherein the PV array comprises a plurality of strings of PV modules coupled in parallel, and a first subset of the strings of PV modules are online and a second subset of the strings of PV modules are offline;
    monitors current data from a set of current sensors that each measure current provided from a corresponding set of strings of PV modules of the plurality of strings of PV modules of the PV array; and
    provides a second command to the inverter to adjust the backfeed voltage such that the current data from at least one current sensor indicates that current flowing from the power grid to the corresponding set of strings of PV modules is below a safety threshold, wherein a current flowing to the corresponding set of PV modules is about equal to a current flowing to each of the first subset of strings of PV modules that are online, such that a surface temperature of each PV module in the first subset of strings of PV modules is increased.

2. The controller of claim 1, wherein each current sensor in the set of current sensors monitors a current flowing to the corresponding string of PV modules.

3. The controller of claim 2, wherein each port of a combiner box is switchably coupled to the inverter and switchably coupled to a particular subset of the plurality of strings of PV modules that form each respective subset of the PV array.

4. The controller of claim 3, wherein the first subset of strings of PV modules is coupled to a given port of the combiner box.

5. The controller of claim 4, wherein the second subset of strings of PV modules is coupled to other ports of the combiner box.

6. The controller of claim 3, wherein a given string of PV modules in the first subset of strings of PV modules and another string of PV modules in the second subset of strings of PV modules are switchably coupled to a same port of the combiner box.

7. The controller of claim 1, wherein a surface temperature of each PV module in the second subset of strings of PV modules that are offline is independent of the backfeed voltage.

8. The controller of claim 1, wherein the controller provides the first instruction in response to a request from a SCADA system.

9. The controller of claim 1, wherein the initial backfeed voltage is greater than a voltage output by the first subset of strings of PV modules of the PV array.

10. The controller of claim 1, wherein the controller further:
    provides a third command to the inverter to disable the backfeed voltage; and
    provides a fourth command to the inverter to resume the backfeed voltage in response to the current data from the at least one current sensor indicating that current flowing from each corresponding set of strings of PV modules is below a power generation threshold.

11. A power generation system comprising:
    an inverter coupled between a power grid and a PV array, wherein the PV array comprises a plurality of strings of PV modules coupled in parallel, and a first subset of the strings of PV modules are online and a second subset of the strings of PV modules are offline;
    a photovoltaic (PV) array switchably coupled to the inverter;
    a set of current sensors that each measure current provided from a corresponding set of strings of PV modules of the plurality of strings of PV modules of the PV array; and
    a controller that:
    provides a first command to the inverter to apply an initial backfeed voltage on the PV modules;
    monitors current data from the set of current sensors; and
    provides a second command to the inverter to increase the backfeed voltage such that the current data from at least one current sensor indicates that current flowing from the power grid to the corresponding set of strings of PV modules is below a safety threshold, wherein a current flowing to each corresponding set of PV modules is about equal to a current flowing to each of the first subset of strings of PV modules that are online, such that a surface temperature of each PV module in the first subset of strings of PV modules is increased.

12. The power generation system of claim 11, wherein each current sensor in the set of current sensors monitors a current at the corresponding string of PV modules.

13. The power generation system of claim 12, wherein each port of a combiner box is switchably coupled to the inverter and switchably coupled to a particular subset of the plurality of strings of PV modules that form each respective subset of the PV array.

14. The power generation system of claim 13, wherein a given string of PV modules in the first subset of strings of PV modules and another string of PV modules in the second subset of strings of PV modules are switchably coupled to a same port of the combiner box.

15. The power generation system of claim 11, wherein a surface temperature of each PV module in the second subset of strings of PV modules that are offline is independent of the backfeed voltage.

16. The power generation system of claim 11, wherein the controller provides the first command in response to a request from a SCADA system.

17. The power generation system of claim 11, wherein the initial backfeed voltage is greater than a voltage output by the first subset of strings of PV modules of the PV array.

18. The power generation system of claim 11, wherein the controller further:
    provides a third command to the inverter to disable the backfeed voltage; and
    provides a fourth command to the inverter to resume the backfeed voltage in response to the current data from the at least one current sensor indicating that current flowing from the corresponding set of strings of PV modules is below a power generation threshold.

19. A method for melting snow and/or ice accumulating on photovoltaic (PV) modules of a PV array comprising:
providing, from a controller, a first instruction to an inverter coupled between the PV array and a power grid to apply an initial backfeed voltage on PV modules of the PV array, wherein the PV array comprises a plurality of PV strings of PV modules coupled in parallel, and a first subset of the strings of PV modules are online and a second subset of the strings of PV modules are offline;
monitoring current data from a set of current sensors that each measure current provided from a corresponding set of strings of PV modules of the plurality of strings of PV modules of the PV array; and
providing a second instruction to the inverter to adjust the backfeed voltage such that the current data from at least one current sensor indicates that current flowing from the power grid to the corresponding set of strings of PV modules is below a safety threshold, wherein a current flowing to the corresponding set of PV modules is about equal to a current flowing to each of the first subset of strings of PV modules that are online, such that a surface temperature of each PV module in the first subset of strings of PV modules is increased.

20. The method of claim 19, wherein each port of a combiner box is switchably coupled to a particular subset of the plurality of strings of PV modules that form each respective subset of the PV array, and a given string of PV modules in the first subset of strings of PV modules and another string of PV modules in the second subset of strings of PV modules are switchably coupled to a same port of the combiner box.

* * * * *